United States Patent
Aubert et al.

(10) Patent No.: US 6,578,917 B1
(45) Date of Patent: Jun. 17, 2003

(54) SEAT

(75) Inventors: Thierry Aubert, Zurich (CH); Phillip Anget, Zug (CH)

(73) Assignee: Girsberger Holding AG, Butzberg (CH)

( * ) Notice: Subject to any disclaimer, the term of this patent is extended or adjusted under 35 U.S.C. 154(b) by 0 days.

(21) Appl. No.: 09/856,279

(22) PCT Filed: Nov. 16, 1999

(86) PCT No.: PCT/EP99/08809

§ 371 (c)(1),
(2), (4) Date: May 18, 2001

(87) PCT Pub. No.: WO00/29249

PCT Pub. Date: May 25, 2000

(30) Foreign Application Priority Data

Nov. 18, 1999 (DE) .......................... 198 53 156

(51) Int. Cl.[7] ................................ B60N 2/02
(52) U.S. Cl. .................. 297/317; 297/330; 297/362.11; 297/322
(58) Field of Search ............................ 297/330, 362.11, 297/322, 320, 317

(56) References Cited

U.S. PATENT DOCUMENTS

| | | | | |
|---|---|---|---|---|
| 4,669,780 A | * | 6/1987 | Sakakibara et al. | 297/257 |
| 4,861,106 A | * | 8/1989 | Sondergeld | 297/316 |
| 4,935,680 A | | 6/1990 | Hiroshi | |
| 5,170,364 A | * | 12/1992 | Gross et al. | 702/139 |
| 5,263,765 A | * | 11/1993 | Nagashima et al. | 297/284.6 |
| 5,320,409 A | | 6/1994 | Kazuhito et al. | |
| 5,449,218 A | | 9/1995 | Albert et al. | |
| 5,558,399 A | | 9/1996 | Hector | |
| 6,220,667 B1 | * | 4/2001 | Wagner | 297/391 |
| 6,334,648 B1 | * | 1/2002 | Girsberger et al. | 297/216.19 |

FOREIGN PATENT DOCUMENTS

| | | | |
|---|---|---|---|
| DE | 19644376 A | | 4/1998 |
| EP | 0489310 A | | 6/1992 |
| EP | 0865960 A | | 9/1998 |
| WO | WO-94 10877 | * | 5/1994 |
| WO | 9710117 A | | 3/1997 |

* cited by examiner

Primary Examiner—Peter M. Cuomo
Assistant Examiner—Joseph Edell
(74) Attorney, Agent, or Firm—Volpe and Koenig, P.C.

(57) ABSTRACT

The invention concerns a seat (1) with at least one seat base part (2) and at least one backrest part (3) which seat is supported on a seat carrier (4) and is movable in relation to said carrier by positioning drive (5, 6). Considering one of possibly multiple seats (1) it is of advantage, that the positioning drive (5, 6), is in controlling connection with at least one body position sensor (12, 13) to enable the advancing or retracting of a seat base part (2) and/or a backrest part (3) in accord with the bodily position assumed by a person on said seat (1), or, for the retraction of the seat base part (2) and or backrest part (3) in accord with a bodily movement of a person on the seat (1). In this arrangement, the seat base part (2) and/or the backrest part (3), are movably guided in an enforced guidance and pivotally connected to one another by a pivot connection (7), and in addition the seat base part (2) and the backrest part (3) are guided, at a prescribed distance from the pivot connection (7), and can rotate about their guide axes or guide pins (8, 9). This seat (1) is especially comfortable and simple to manipulate and offers an ergonomically favorable arrangement in any adjustment position for the user, because of the enforced guidance system, and the linkage (7) in connection with seat base part and backrest part.

14 Claims, 4 Drawing Sheets

SEAT

BACKGROUND

The invention concerns a seat, with at least one seat base part and at the least a back rest, which are secured on a seat carrier and is adjustable relative to the carrier by means of a positioning drive, wherein the positioning drive is in controlling communication with at least one body position sensor for advance or retraction of the at least one seat part and the at least one back rest part in accordance with the body position taken by a person on the seat or for retraction of the at least one seat part and at least one back rest as signaled by a body movement of the person sitting on the seat.

From EP 0 865 960 A1, the application is now aware of an automobile seat with a seat base part and a backrest part, that are pivotably connected together by a pivot pin or pivot axis and are guided on a seat carrier in guide elements. This known seat includes a stop transmission which holds the seat base part and the backrest part in different positions. This fixed seat position effecting stop transmission is energy absorbing in such a manner that the seat may during a rear collision or a frontal collision through crash generated forces transfer the user of the seat from a normal seat position to a safety position.

The previously known automobile seat offers the user in rear as well as frontal collision a high measure of safety. This allows the user of the previously known seat to place the seat in a desired position. To adjust the seat part and the backrest, however, the stop transmission must be released and the seat must be moved in the guide element of the seat carrier with a certain expenditure of energy. The safety and the comfort, which the known automobile seat provides the user in the seated and adjusting position is a tradeoff with the force and time expenditure, required by the user to place the seat in a desired position.

From DE 196 44 376 A1, an automobile seat of the known art is disclosed, in which the seat part and the backrest part are adjustable through a motorized positioning arrangement. In that patent, it is proposed that in the seat part and in the backrest part, which are described as seat components, individual pressure sensors and drives are located. The direction of action of said parts is dependent upon the seating position of a previous user and from the posture pressures of a present user at the start of the adjustment procedure.

The description of DE 196 44 376 teaches, that various parts of the vehicle seat can be adjusted individually or again, optionally by a loading of the pressure sensors. However, senseless adjustment movements are not excluded and the user is put to great effort, to find a sitting position which is both ergonomically favorable and comfortable.

Besides this, there is another generic type of vehicle seat known, in which multiple positioning drives are adjustable in relation to one another and in relation to a seat carrier placed on the vehicle floor. These positioning drives are to be activated by the user individually and separate from each other. Furthermore, the user can respectively adjust the seat base drive and the backrest drive until the relative positions of the seat base part and the backrest part appear to be comfortable. For the operation of these positioning drives, several activating switches have been installed in this differing vehicle seat. These switches are to be generally sequentially activated by the user, one after the other. Thus these seats, especially for a person not practiced in their use, can only be operated with a considerable expenditure of time and effort.

SUMMARY

Thus the objective exists, of creating a seat of the generic type mentioned in the introductory passages, which seat is especially comfortable and in particular, easily manipulated, and which, by means of different adjustment motions, leads to an ergonomically favorable sitting position.

The achieving of this objective, in accordance with the invention, is to be found in a seat of the type described in the introductory passages, wherein at least one seat base part and at least a backrest part are adjustably movable by guide elements constrained to function within given limitations, i.e. hereinafter "enforced guides". In this way, the seat base part and the backrest part are pivotally connected to one another and the seat base part and the backrest part respectively, have guides spaced from the pivoting axis and are rotatable about the guide axes or guide pins, and the backrest part assigned positioning drives in particulars are simultaneously activated by a common enabling switch.

Because of the guidance of the seat base part and the backrest part in the form of enforced guide elements, and because of the pivoting connection of these parts, one with the other, an adjustment of one of said parts leads to a corresponding relative position of the other. Thus, through the formulation of these enforced guides, the individual adjustment movements can result in no unfavorable relative positions of the parts between one another, but in each case, ergonomic positions are arrived at. Thus, the user can very quickly make one adjustment which results not only in user comfort and at the same time, achieves a seating which is ergonomically correct.

The enforced movement correlation of the at least one seat part and/or the at least one backrest part can be an integral guidance, for instance elongated slots or tubes with internal, slidable members which provide very precise positioning means. Such positioning means simultaneously determine the respective position and thereby prevent swinging or wobble motions of such a seat.

The enforced guidance or the integral control of the at least one seat part and/or the at least one backrest part can be provided on both sides of the seat, so that correspondingly symmetrical force apportionment is made possible.

The positioning drive of the inventive seat is controllingly connected with at least one body position sensor. After the positioning drive has been activated, then the control signals can be transmitted to the positioning drive. Having received the signals, the positioning drive acts to synchronously move the seat base part and/or backrest parts in such a manner forward or back, as directed by the body position or the body movement assumed by the user, until seat base parts and/or the backrest parts properly contacts the body of the user, or approaches such contact. Thus the user need not, as far as body position is concerned, attempt and try various seating movements until the seat exhibits a comfortable seating position. Much better, the inventive seat moves to accommodate that body position which the user has been previously found to be comfortable and therefore has previously assumed that position or would like to so sit once again.

Because the seat base part and backrest part assigned positioning drives are simultaneously activated by a common enabling switch, the seat in accordance with the invention provides synchronous body positioning movement. Therefore the user can adjust to a previous body position, for example angle his legs and at the same time incline the upper body forward while the seat base part and the backrest part adapt synchronously to these body movements.

In this manner the common switch may be activated, for example manually activated or through a voice or sound recognition.

The inventive seat can, for instance, be designed as an office chair or similar type of seating furniture, wherein the seat carrier forms the legs of the chair. Since, in motor vehicles adjustable seating is already in common use, and the source of energy necessary for the positioning drives is available in the immediate vicinity of the seat, the seat may be advantageously employed as a vehicle seat.

It is possible for the seating surface to be formed from many parts and include, for example a seat base part, a lumbar section and a positionable backrest part.

A simple embodiment, in accord with the invention, provides that the body position sensor is designed as a proximity measuring device, which, advantageously is placed in the area of the seat. Such a device can, for instance, possess ultra sonic or infrared sensors, which are placed somewhere in the area of the instrument panel of a motor vehicle. The possibility also exists, however, that the proximity measurement device is based on inductive sensors, which detect the changes in a magnetic field or an electrical field which are associated with corresponding changes in position by body movement.

Additionally, or instead of, these, it can be of advantage is at least one body position sensor function as a pressure sensor or a pressure switch. Such a sensor activates or halts the positioning drive assigned to it as is appropriate for the under or overstepping of a specified pressure loading. In this arrangement, a preferred improvement of the invention is brought about, wherein at least one body position sensor, for example a pressure sensor or pressure switch, controls its matched positioning drive. Such pressure sensors can thus control even the movement direction of the positioning drive in a simple manner. Thus it is possible, that the body position sensor of this type reacts to pressure changes in such a manner, that the positioning drive with which it is connected adjusts the seat within a given time and in a proper direction, until the drive once again generates a defined averaged pressure at the corresponding body position sensor.

In order to be able control the required positional movements and body-fitting adjustments of the seat in good order, it is advantageous if a first body position sensor is placed in the backrest part, preferably located at shoulder height, and if a second body position sensor is placed in the seat base, particularly located in the forward, free, exposed end area.

Particularly, the combination with the enforced guidance of the seat base part and the backrest part, the interlinked connection and pivotal rotatability of said parts gives rise to a particularly comfortable embodiment of the invention. Furthermore, this makes possible that the seat base part and backrest part can be activated and controlled by the fewest possible positioning drives, which are possibly also smaller than the usual size. At the same time, in spite of the seat's ability to adjust to different positions involving both the parts of the seat base or backrest, senseless, uncomfortable and especially unfavorable ergonomic positions of these parts relative to one another is avoided. Also dispensed with is the adjust and try method of escaping such unfavorable positions, which causes corresponding loss of time of the user.

It can be advantageous, if at least one positioning drive is equipped with a manual override drive. A further advantage is gained if the seat base part and/or backrest part can be set in the chosen sitting position especially by means of a position fixing apparatus. Such an embodiment permits a servo-subsupported placement of the seat or possibly a placement by the user of the seat with the manual override alone. Instead of the otherwise preferred positioning drive with self-limiting spindles, which make a fixed placement device superfluous, with this design incorporating the servo-positioning device, which, for instance, can be made as a toothed rod drive, and can coact with a fixed placement arrangement.

It is advantageous, when the seat carrier of the vehicle seat is adjustably held in relation to the vehicle floor by a positioning drive, that the positioning drive is in controlling connection with a control system and that the control of the vehicle seat is dependent on at least the person-based data of the chosen angle of inclination of the seat base part. If the body position sensor is designed as a pressure sensor, for instance, the load of the body weight of the user upon the seat base part can be determined. This can be converted by the control system to normal body sizing and subsequently the seat is so adjusted, relative to the vehicle floor, that the user has a sufficient leg room and/or sits at a proper distance from the windshield of the vehicle. Additionally, or instead of this, the chosen angle of inclination of the seat base part can be computed, compared with normal body sizes, and the seat subsequently positioned in relation to the floor.

A further embodiment of the invention can be comprised in that the body position sensor(s) is a travel or motion sensor. In this way, corresponding motions of the user can be measured for the extension of a defined adjustment of the individual parts of the seat and converted into corresponding positioning movements. These movements can moreover be input to memory, so that the respective favorable sitting position can be quickly found again after an intervening different positioning. A travel or movement measuring device permits, in the said operation, a precise conversion into a adjustment motion, because a sensitive activation is possible, especially if a correspondingly larger travel, as compared to a pressure sensor, leads to the respective displacement.

The body position sensor(s) can be a pivoting or a linear pick up for motion. For instance, a pivoted lever or a teeter bar or a plate movable at right angles to its surface, which is coupled with at least one potentiometer or the like measurement accepting device and coacts with the same. In this way, either by a teeter bar or a lever pivoted at one end, or a rotational potentiometer mounted on the rotating pin or even a linear potentiometer can be provided, which is also of advantage with a movable plate.

The sensor, provided for travel or motion of body position, in particular the pivotally or the linearly movable motion pickup, in this application, can be movable against a reset force into a displaced position, and by means of said reset force, for instance, a spring and/or the upholstery of the seat be moved back into a start position. This affords a particularly simple possibility of installing a body position sensor hidden inside the upholstery of a seat thus being not only space saving but also effective.

BRIEF DESCRIPTION OF THE DRAWINGS

In the following, preferred embodiments of the invention are described in greater detail with the aid accompanying drawings. In this way, the individual features, can be presented both on their own or as several in one embodiment, or even as feasible in another embodiment. For the most part, in schematic presentations, there is shown in.

DETAILED DESCRIPTION OF THE PREFERRED EMBODIMENT

A seat 1 is respectively presented in the FIGS. 1, 2, 3 and 4, which seat, in this given case, is designed as a vehicle seat.

Figure 1:
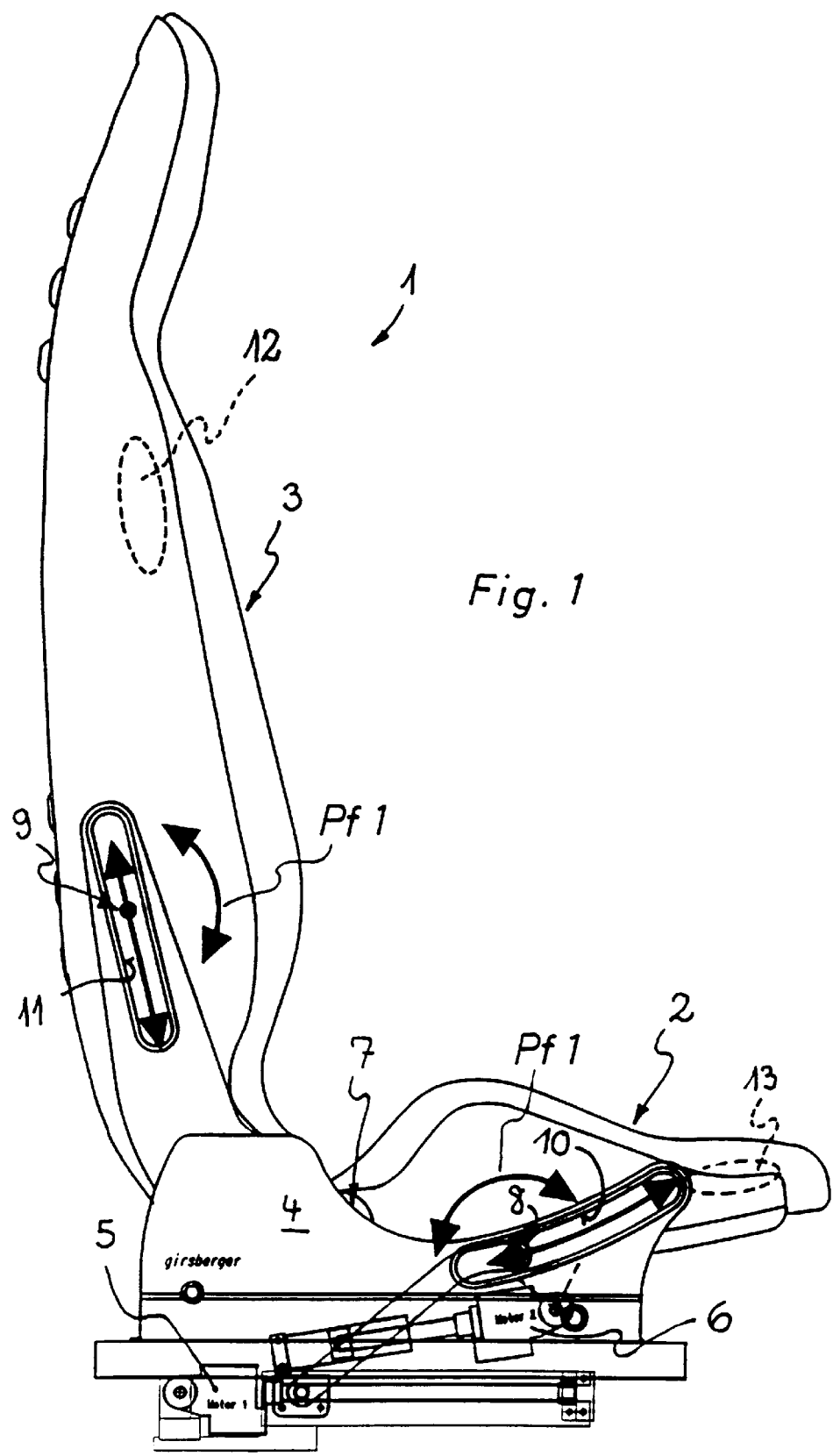
FIG. 1 is a side view of a vehicle seat which includes a seat base part and a backrest part, which parts, by means of assigned positioning drives are adjustable in relation to one another and to a seat carrier, wherein the backrest part of this figure accommodates a nearly vertical sitting position.
Figure 2:
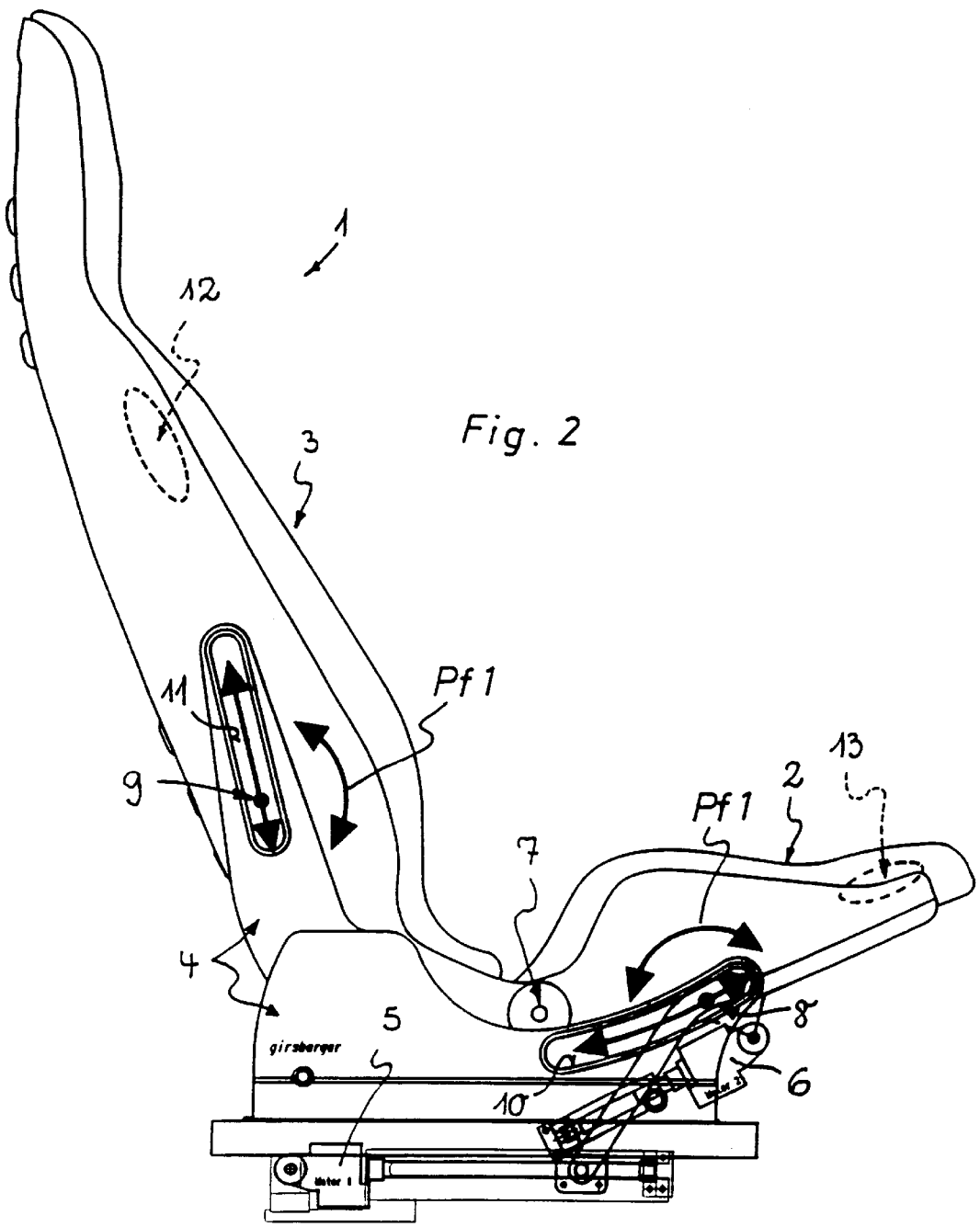
FIG. 2 is a side view of the seat of FIG. 1 in a sitting position in which the backrest part is set back, opposite to the direction of travel and the angle between the seat base part and the back rest part has been increased in size, FIG. 3 in an even more strongly diagrammatic representation of a vehicle seat, in which both in the seat base part as well as the backrest part, respectively a teeter bar device or pivoting lever is placed as a travel or motion pickup, and FIG. 4 a view corresponding to FIG. 3, wherein both in the seat base part as well as in the backrest part respectively, a plate, adjustably movable at right angles to its extended surfaces serves as a travel and motion measurement device coacting with a linear potentiometer.
Figure 3:
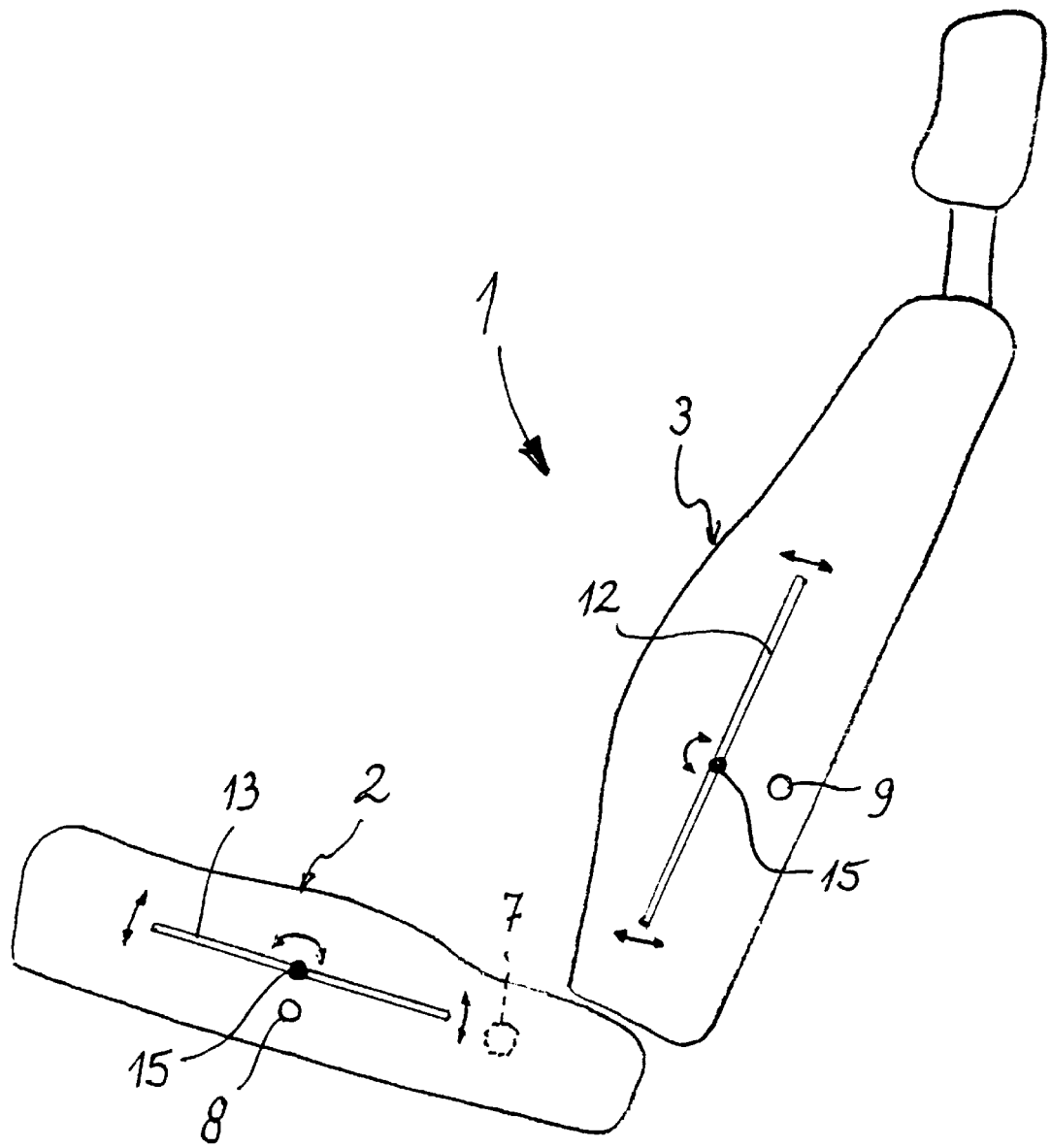
Figure 4:
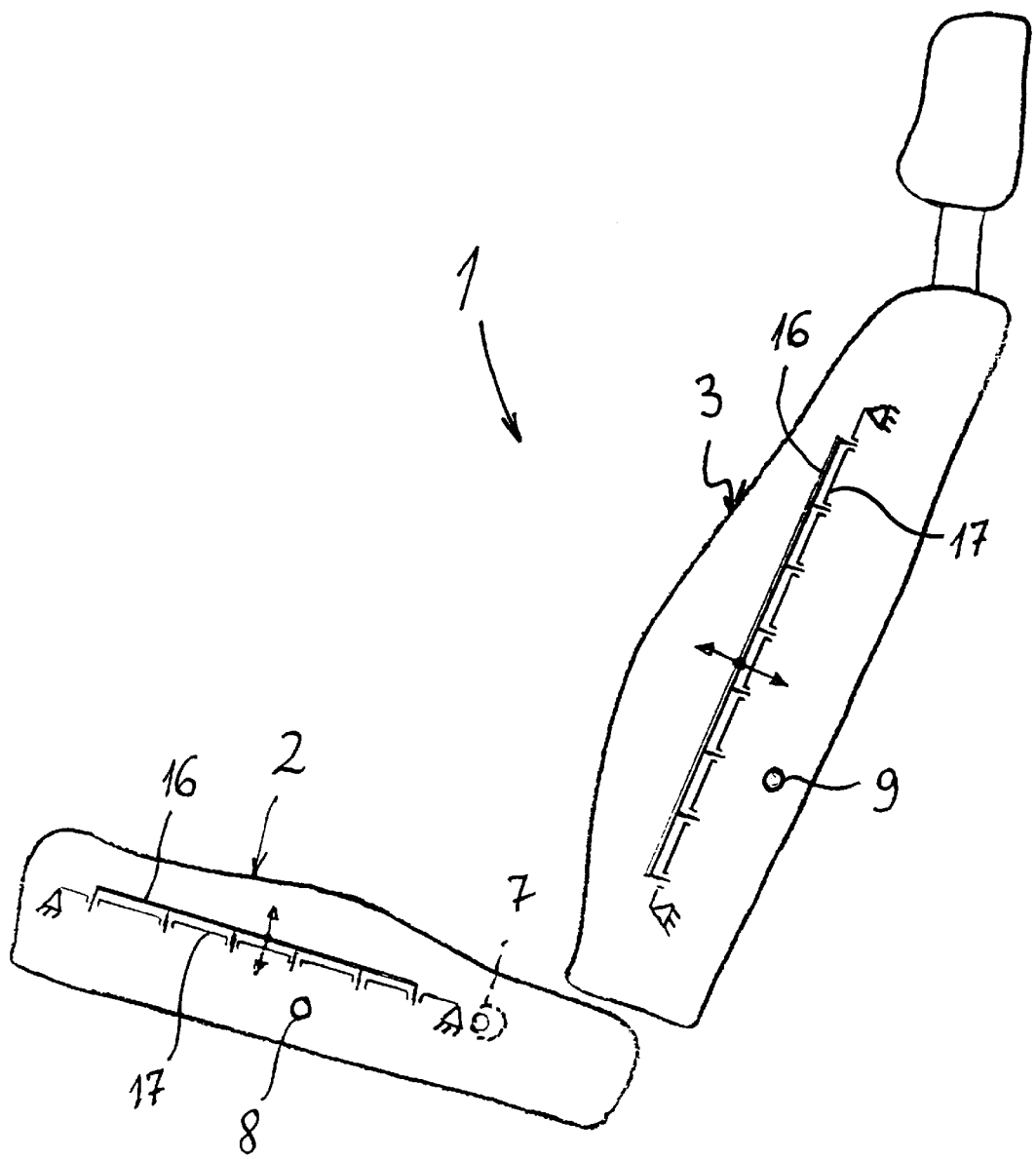

In this respect, this seat 1 in the FIGS. 1, 2, is delineated in greater detail although the corresponding following explanation and descriptions are valid also for the seat as shown in FIGS. 3, 4. In FIGS. 3, 4, non-essential details are lacking and only a seat base part 2 and a backrest part 3 with head rest are shown, without the seat carrier 4 and the operational components which coact therewith.

The seat 1 includes a seat base 2 and a backrest part 3, which are located on a seat carrier 4 and the parts are adjustable in relation to the seat carrier 4 and to one another. The seat carrier 4 is affixed to the floor (not further detailed here) of the vehicle.

Positioning drives 5, 6 are provided for the adjustment of the seating position, which drives engage on the under part of the seat base 2. As is clarified by reference to FIGS. 1 and 2, the seat base 2, as well as the backrest part 3 of seat 1, which is pivotally interconnected with seat base 2 by a pivot pin 7, are both guided in an enforced guidance structures, which in this case are designed as sliding link pins. Both the seat base part 2 as well as the backrest part 3 are, in addition thereto, respectively, at a spatial interval from the linkage pin 7, also restrictively guided by a guide pin 8, 9 in a guide slot or pivot slot 10, 11.

While the guide slot 10, assigned to the seat base part 2, runs upward in the direction of vehicle travel in an arc-like shape, the guide pin 9 of the backrest part 3 is caused to move in a direction transverse to the direction of vehicle travel in the confines of an upward tilted linear guide slot 11.

As is indicated by the direction of rotation arrow Pf1, the seat base part and the backrest part 3, respectively, are rotatable around their guide pins 8, 9, which are constrained within their guide slots 10 and 11. Although, by means of the positioning drive 5, the inclination of the seat shell, which shell is formed from both the seat base part 2 and the backrest part 3, is altered, the angle of inclination of the backrest part 3 can still be adjusted, and with the aid of the positioning drive 6, the angle between the seat base part 2 and the said backrest part 3 can also be adjusted.

Body position sensors 12, 13, are provided for the adjustment of the seat base 2 and the backrest part 3. These sensors, which are in controlling connection with the positioning drives 5, 6, serve for the advance or retraction of the seat part 2 and the backrest part 3 to match the bodily position of the user, or to suit such bodily movements as are carried out by the user. The body position sensors 12, 13 are installed underneath the seat cushion of the seat 1 and are thus not seen externally. Although the body position sensor 12 located at shoulder height in the backrest part 3 is connected to the positioning drive 5, the provided body position sensor 13, located in the forward free end area of the seat base part 2, is in controlling connection with the positioning drive 6.

After the activation of the positioning drives 5, 6, the control signals of the body position sensors 12, 13 are transmitted to the same positioning drives 5, 6, so that these drives allow the seat base part 2 and the backrest part 3, to which they are assigned, to move into the body position assumed by the user, in such a fashion, that the seat base 2 and/or the backrest part 3 lies against the body of the user or closely approaches this position. The seat 1, with equal facility, can follow the user's body movements forward or backward, relative to the direction of vehicle travel, or again follow his bodily thigh movements directed upward or downward in practically a bodily synchronization. In this way, the here described seat 1 fits that bodily configuration of the user, which said user has found comfortable and on this account has assumed such positioning previously.

The positioning drives 5, 6 are to be activated by means of a common enabling switch. Upon the activation of this enabling switch, which is commonly found on the steering post, bodily synchronized position movements become possible for both the seat base part 2 and the backrest part 3.

The body position sensors 12, 13, in this case, are made as pressure switches or pressure sensors, whereby these body position sensors 12, 13 are in controlling contact with a (not shown here) control system connected to the positioning drives 5, 6.

The body position sensors 12, 13 so regulate the positioning drives assigned to them, that upon the exceeding of a first pressure value, these assigned drives move the seat base part 2 and/or the backrest part 3, which are governed by said drives, in a direction away from the user. Conversely, in the case of dropping below a second pressure value, the said drives adjust the said seat base part 2 and the backrest part 3 in a direction toward the user. The body position sensors 12, 13, which react to pressure changes, allow the positioning drives 5, 6, with which they are in controlling communication, to carry out the directional positioning movements up to the point until once again the body position sensors 12, 13 again establish a defined average pressure.

If the user leans forward with his shoulder, this loss of pressure is transmitted by the body position sensor 12 to the control system, which activates the positioning drive 5. As a consequence of this, the seat shell formed from seat base part 2 and the backrest part is run forward and the body movement is followed.

Should the user, for instance, increase the angle of his legs, then the body position sensor 13 is relieved of pressure, whereby the positioning drive 6 retracts seat base part 2, until the body position sensor 13 is once again loaded with body weight and the positioning drives 5, 6 are deactivated because of release from the enabling switch.

If the user presses his shoulder contrary to the direction of vehicle travel, i.e. to be back, and places additional load on the body position sensor 12, then the seat shell, comprising the seat base part 2 and the backrest part 3, is pivoted by the positioning driver 5, contrary to the direction of travel, toward the back and the seat 1 thus also follows this body movement. Conversely, an added loading onto the body position sensor 13 by the legs, leads to a positional motion of the positioning drive 6, which runs the forward, free, exposed end area of the seat base part 2 downward and the angle between the seat base part 2 and the backrest part 3 becomes greater.

Since the positioning drives 5, 6 can be activated by a common enabling switch, the user, in accord with his preferred body position, can angle his legs and at the same time incline his torso forward, while the seat base part 2 and the backrest 3 synchronously fit this body movement.

The electrical positioning drives 5, 6 are here designed as self limiting spindle drives, which maintain the seat position even without an auxiliary securement apparatus.

The pressure switch which serves here as a body position sensor or sensors, can, for instance be designed from a pressure tube, the inside pressure of which is transmitted to a pressure evaluation device. Such a pressure tube can, in good order, also include a surface loading of the seat base part 2 and/or the backrest part 3.

In order to offer the user the greatest possible operational comfort, it can be of advantage, if the positioning drives can also, on option, be separately activated by the activation switch. It is also possible, that the control memory functions (not discussed here) can be called up, which can move the seat 1 by means of the positioning drives 5, 6 into a sitting position, which is matched to a specific user.

The seat 1, in accordance with FIG. 3 corresponds to the seat 1 described in the foregoing insofar as the seat carrier 4, the positioning drives 5, 6, pivot pin 7, guide pins 8 and 9 and guide slots 10 and 11, as well as the individual movements.

Principally, the body position sensors 12 and 13 deviate in both FIG. 3 and FIG. 4 by being designed as travel or motion measurement devices.

FIG. 3 shows in a schematic presentation, that the body position sensors 12, 13 are respectively, pivoting motion sensors, namely, they could be teeter bars, which swing about a somewhat mid positioned axle 15. The more this teeter bar is swung, just so much is the respective seat part deflected or moved. Instead of a teeter bar, also a one armed lever could swing relative to the axle 15 within the seat base part 2 or the backrest part 3. With this arrangement, one recognizes that motion can be made somewhat in the direction of the travel of the vehicle.

FIG. 4, departing from this, shows a plate 16, which is displaceable in a direction transverse to its surface, coupled with a stationary potentiometer 17 or a like measurement device. The so movable plate 16 coacts with the fixed potentiometer 17 and by means of relative displacement motion, a movement measurement is created for the respective displacement, which can be converted into a corresponding seat position movement.

The travel or motion sensor respectively provided as body position sensor 12 or 13, as shown in FIG. 3 or 4 in its operative mode, is movable counter to a resetting force when in the displaced position. Also, this said resetting force, emanating from a (not shown) spring and/or the upholstering of the seat, can return said sensor to its starting position.

With the above arrangement, the advantages are retained of the coupling of the seat base part 2 with the backrest part via the pivot 7 as well as the enforced guidance of these parts, so that even upon the use of such travel and motion measuring devices, the user can quickly adjust for himself an individual, comfortable sitting position, which at the same time, is ergonomically favorable.

The same is valid, if, instead of above noted devices as a body position sensors, a device for measuring increments of distance is placed within the seat, which then, in order to adjust the seat, interprets detected movements carried out by the user as changes in distance and carries through corresponding adjustment movements of the seat 1.

The presented embodiments of the seat 1 characterize themselves by a high degree of sitting comfort as well as by an especially simple manipulation. At the same time, senseless relative adjustment movements between the seat base part 2 and the backrest part 3 have been avoided by means of their special coupling by the pin 7 and their enforced guidance. Also eliminated is the continual loss of time of the user involved in making adjustments to the seat 1 and its components.

As a whole, there is provided a seat 1 with at least one seat base part 1 and/or a backrest part 3, which is secured on a seat carrier 4, and relative to this is adjustable by means of a positioning drive 5, 6. For the seat 1 it is advantageous, that the positioning drive 5, 6 stands in controlling connection with at least one body position sensor 12, 13 for the advance and retraction of the at least one seat base part 2 and the at least are backrest part 3 in accordance with the position assumed by the person on the seat 1 or the retraction of the at least one seat base part 2 and/or backrest part 3 according to a body movement of the person on the seat 1. In this arrangement, seat base part 2 and backrest part 3 are adjustably guided in an enforced guidance and are pivotally bound to one another by a pivoting axis 7. Also, the seat base part 2 and the backrest part 3 are respectively guided at a prescribed distance from this pivoting axis 7 and are rotatable about their guide axes or guide pins 8, 9. This seat 1 is especially comfortable and easy to manipulate and possesses in any adjusted position an ergonomic arrangement favorable for the user because of the enforced guidance and the connection of the seat base part 2 and the backrest part 3.

What is claimed is:

1. A seat (1), with at least one seat base part (2) and at least one a backrest part (3), which seat (1) is supported on a seat carrier (4) and is adjustable relative to said carrier (4) by a positioning drive (5, 6), whereby the positioning drive (5, 6) is in controlling connection with at least one body position sensor (12, 13) for advancing or retracting of the at least one seat base part (2) and the at least one backrest part (3) in accordance with the body position assumed by a person on said seat (1) or for the retraction of the at least one seat base part (2) and the at least one backrest part (3) corresponding to a body motion of the person on said seat (1), characterized in that the at least one seat base part (2) and the at least one backrest part (3) respectively are adjustably guided in an enforced guidance, and the seat base part (2) and the backrest part (3) are pivotally connected to one another, by a pivot pin (7) and the seat base part (2) and the backrest part (3) are respectively guided at a distance from the pivot pin (7) and are rotatable about the guide axes or guide pins (8, 9), and that the positioning drives (5, 6) of the seat base part (2) and the seat backrest part (3) are simultaneously activatable, and at least one body position sensor comprising a pressure sensor or a pressure switch (12, 13) is located in at least one of the seat base part and the seat backrest part which activates or stops the positioning drive (5, 6) assigned thereto, dependent upon exceeding or being less than specified pressure loadings.

2. A seat in accordance with claim 1, characterized in that the enforced guidance for the at least one seat base part (2) and/or for the at least one backrest part (3) is a closed guide.

3. A seat in accordance with claim 2, characterized in that the enforced guidance for the at least one seat base part (2) and/or for the at least one backrest part (3) is provided on both sides of the seat (1).

4. A seat in accordance with claim 1, characterized in that the seat (1) is designed as a vehicle seat.

5. A seat in accordance with claim 1, characterized in that the seat (1) includes at least one seat base part (2) and at least one backrest part (3) and in that the seat base part (2) and the backrest part (3) are respectively adjustable relative to the seat carrier (4) as well as adjustable relative to one another.

6. A seat in accordance with claim 1, characterized in that at least one body position sensor designed as distance measuring device, is located in the area of the seat.

7. A seat in accordance with claim 1, characterized in that at least one body position sensor (12, 13) controls the positioning drive (5, 6) assigned thereto in such a manner, that the drive (5, 6), upon the exceeding of a first value of pressure moves the thereto assigned seat base part (2) and/or backrest part (3) in a direction away from the user, and upon the failure to meet a second value of pressure, moves the assigned part (2, 3) in a direction toward the user.

8. A seat in accordance with claim 1, characterized in that at least one body position sensor (12, 13) reacts to a change of pressure, such that at least one positioning drive (5, 6) in controlling connection therewith, displaces the seat (1) in a direction and for such a time period, that the body position sensor (12, 13) again adjusts to a given average pressure.

9. A seat in accordance with claim 1, characterized in that a first body position sensor (12) is placed in the backrest part (3), advantageously in the area of the shoulder, and that a second position sensor (13) is placed in the seat base part (2) in a forward, free end area thereof.

10. A seat in accordance with claim 1, characterized in that at least one positioning drive is manually adjustable and in that the seat base part and/or backrest part respectively assigned to said positioning drive, can be affixed in a chosen seat position by a securement apparatus.

11. A seat in accordance with claim 1, characterized in that the seat carrier of the vehicle seat is adjustably held relative to the vehicle bottom by a positioning drive, and in that the positioning drive is in controlling connection with a control system and in that the control adjusts the vehicle seat and/or the chosen angle of inclination of the seat components depending on person-based data transmitted by at least one body position sensor.

12. A seat in accordance with claim 1, characterized in that the body position sensor (12, 13) is a travel or a motion measuring device.

13. A seat in accordance with claim 1, characterized in that the body position sensor (12, 13) is a pivoting or linear motion receiver, for instance a pivoted level or a teeter bar or a plate (16) displaceable at right angles to a surface thereof, which plate is coupled and coacts with at least one potentiometer (17) or measurement receiver.

14. A seat in accordance with claim 1, characterized in that a travel or motion measuring device is provided as a body position sensor (12, 13) and includes a pivotal or linear movable motion detector that is movable against a resetting force in a displaced position, and the resetting force moves the detector back into a starting position.

* * * * *